United States Patent (10) Patent No.: US 12,397,425 B2
Jha et al. (45) Date of Patent: Aug. 26, 2025

(54) SYSTEM AND METHOD FOR ROBUST PIVOTING FOR RE-ORIENTING PARTS DURING ROBOTIC ASSEMBLY

(71) Applicant: Mitsubishi Electric Research Laboratories, Inc., Cambridge, MA (US)

(72) Inventors: Devesh Jha, Cambridge, MA (US); Yuki Shirai, Los Angeles, CA (US); Arvind Raghunathan, Cambridge, MA (US); Diego Romeres, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 406 days.

(21) Appl. No.: 17/655,466

(22) Filed: Mar. 18, 2022

(65) Prior Publication Data
US 2023/0294283 A1 Sep. 21, 2023

(51) Int. Cl.
B25J 9/16 (2006.01)
B25J 9/00 (2006.01)
(Continued)

(52) U.S. Cl.
CPC ........... *B25J 9/1664* (2013.01); *B25J 9/0096* (2013.01); *B25J 9/1612* (2013.01); *B25J 9/1697* (2013.01);
(Continued)

(58) Field of Classification Search
CPC ...... B25J 9/1664; B25J 9/0096; B25J 9/1612; B25J 9/1697; B25J 13/085; B25J 9/1669;
(Continued)

(56) References Cited

U.S. PATENT DOCUMENTS 11,210,833 B1* 12/2021 Daviet ................... G06T 17/20
11,298,818 B2* 4/2022 Kawabata ............. B25J 9/1612
2016/0335223 A1* 11/2016 Zeng ....................... G06F 17/11

OTHER PUBLICATIONS

Fast Planning for 3D Any-Pose-Reorienting Using Pivoting, 2018 IEEE International Conference on Robotics and Automation (ICRA), Brisbane, QLD, Australia, 2018, pp. 1631-1638 (Year: 2018).*

(Continued)

*Primary Examiner* — Adam R Mott
*Assistant Examiner* — James Miller Watts, III
(74) *Attorney, Agent, or Firm* — Gene Vinokur

(57) ABSTRACT

A manipulation controller is provided for reorienting an object by a manipulator of a robotic system. The manipulation controller includes an interface controller configured to acquire measurement data from sensors arranged on the robotic system, at least one processor, and a memory configured to store a computer-implemented method. The instructions of the method include acquiring measurement data from vision sensors and force sensors arranged on the robotic system, determining an input-output relation for the object based on a nonlinear static model representing input-output relationships between contact forces and movements of the object on the workbench, representing interaction between the object and the manipulator using complementarity constraints to capture the contact state between the object and the manipulator, formulating a representation for frictional stability of the object based on the non-linear static model at the external contacts with the workbench; formulating a bilevel optimization problem so as to maximize the frictional stability over a position trajectory of the object being manipulated on the workbench, estimating uncertainty value in physical parameters to be compensated by performing the bilevel optimization problem, solving the bilevel optimization problem using the non-linear optimization (Continued)

solver and generating control data with respect to a sequence of the contact forces being applied to the object by using the manipulator.

21 Claims, 17 Drawing Sheets

(51) Int. Cl.
  *B25J 13/08* (2006.01)
  *G05B 19/4155* (2006.01)
(52) U.S. Cl.
  CPC ........ *B25J 13/085* (2013.01); *G05B 19/4155* (2013.01); *G05B 2219/50391* (2013.01)
(58) Field of Classification Search
  CPC ............... B25J 9/1679; G05B 19/4155; G05B 2219/50391; G05B 2219/39505; G05B 2219/39084; G05B 2219/39149; G05B 2219/40086; G05B 2219/40487

USPC ........................................................ 700/259
See application file for complete search history.

(56) References Cited

OTHER PUBLICATIONS

Yifan Hou et al. "Reorienting Objects in 3D Space Using Pivoting," XP081546057 ARXIV.org, Cornell University Library, Ithaca, NY. Dec. 5, 2019. Abstract, IV-V, VII.

Hogan et al. "Tactuke Dexterity Manipulation Primitives with Tactile Feedback." XP033826317 2020 IEEE International Conference on Robotics and Automation, May 31, 2020. III-V; Fig. 4, VII.

* cited by examiner

|  | Bilevel Optimization |
|---|---|
| $m = 100$ g | 10 / 10 |
| $m = 110$ g | 10 / 10 |
| $m = 140$ g | 10 / 10 |
| $m = 170$ g | 10 / 10 |

FIG. 13

|        | $m$ [g] | $l$ [mm] | $w$ [mm] | $\mu_A, \mu_B, \mu_P$ |
|--------|---------|----------|----------|------------------------|
| gear 1 | 140     | 84       | 20       | 0.3, 0.3, 0.8          |
| gear 2 | 100     | 121      | 9.5      | 0.3, 0.3, 0.8          |
| peg 1  | 45      | 36, 40   | 20, 28   | 0.3, 0.3, 0.8          |
| peg 2  | 85      | 28, 40   | 10, 11   | 0.3, 0.3, 0.8          |

FIG. 15

SYSTEM AND METHOD FOR ROBUST PIVOTING FOR RE-ORIENTING PARTS DURING ROBOTIC ASSEMBLY

TECHNICAL FIELD

The invention relates generally to robotic manipulation, and more particularly to methods for robust optimization for pivoting manipulation which can be used to re-orient parts during a robotic assembly process.

BACKGROUND

Contacts play a central role in all robotic manipulation tasks. While selective use of contacts can allow robots to reason about and manipulate their environment, contact-based reasoning and control tend to be extremely challenging. Contact models are challenging from analytical, algorithmic as well as computational aspects. As a result, very little progress has been made in principled techniques for model-based manipulation. The underlying hybrid dynamics of frictional interaction as well as uncertainty associated with frictional parameters makes efficient design of model-based controllers for manipulation challenging.

Robotic systems are really good for performing pick and place operations in structured environments where they are always fed parts in known orientation and all they need to do is to grasp and move the object to a known location, often by applying a certain amount of force. However, these systems are very fragile if the robot has to make contact with these objects for manipulation or there is uncertainty in the structure that is created for them.

In the current state-of-the-art assembly lines, robots are always provided parts in the desired pose that can be then picked and placed by assembly robots to mate the respective parts for assembly. This is achieved by using specially designed mechanisms that can achieve passive control of the parts by design. However, these are very domain specific and involve a lot of cost in design and commissioning of these systems. On the contrary, we would like to design modular assembly systems which can perform desired manipulation of parts without assistance of any specialized design of part feeders. This can be achieved by designing robotic systems which can use planning and control to reorient different parts during assembly with minimum requirements on specially designed jigs and fixtures. However, manipulation is an underactuated control problem which are generally very difficult to model and control. Moreover, it is desirable that such systems can account for uncertainty in the physical properties of parts during operation. For example, it is desirable that a robot should be able to work with parts with uncertainty in the physical properties. For example, manipulation depends on the geometry, mass, friction properties (e.g., coefficient of friction) of the objects as well as the external environment. It is desirable that the manipulation systems can handle unknown objects with imprecise estimate of these physical parameters to allow for generalization.

This invention relates to design of one such basic manipulation method that a robotic system can use for reorientation of parts during assembly or packing. In particular, this invention presents a pivoting manipulation with two external contacts with environment. While pivoting manipulation has been studied before, all the previous analysis presented in open literature considers sticking contact with the external environment. In contrast, we present pivoting manipulation that requires sustained slipping contact with the external environment. Control of slipping contact in the presence of uncertainties is challenging as it leads to an ill-posed optimization problem, and thus, this invention presents an optimization formulation that can be used for performing robust pivoting by exploiting friction.

SUMMARY

It is an object of some embodiments to provide a robotic system configured to optimize trajectories of motion of an object being manipulated by the robotic system, by optimizing a sequence of control forces acting on the object while manipulating the object.

Some embodiments of the current disclosure are based on the realization that most of the state-of-the-art assembly systems use meticulously designed part orientation and feeding system Some embodiments are based on the recognition that robots can use external contacts to obtain additional dexterity to robots to manipulate pose of objects in their environment. These manipulation problems are important in a lot of applications where the robots are supposed to manipulate parts in different initial conditions to achieve a desired task.

Some embodiments are based on the recognition that robots are supposed to interact with novel work pieces during these manipulation tasks. In absence of such capabilities, the manipulation algorithms would be brittle in the presence of uncertainties and such a system will not be able to generalize to objects of geometry different from the ones for which the controllers were designed. Currently, there are very few techniques that can allow pose manipulation of objects of unknown properties limiting the use of these algorithms to very few controlled environments.

Some embodiments are based on the realization that a robot can use pivoting manipulation as a basic primitive to manipulate the pose of objects for an underlying task by making use of external contacts. However, pivoting manipulation in the presence of uncertainties is a complex manipulation problem due to the unique contact constraints in the presence of uncertainties. Currently, there are no known techniques that can perform robust optimization for manipulation with external contacts which can be used to perform reliable and robust manipulation. This makes optimization and control of robotic manipulation in the presence of parametric uncertainties difficult.

To that end, the present disclosure proposes an optimization method for robust trajectory optimization during manipulation. To solve the underlying manipulation problem, a bilevel trajectory optimization method for generating trajectory in the presence of uncertain parameters is proposed. The proposed formulation introduces the novel concept of frictional stability which is defined as the amount of parametric uncertainty that can be accommodated by redistribution of contact forces to maintain stability in a certain contact configuration during manipulation.

In some embodiments, the frictional stability is computed considering the static equilibrium of an object being manipulated in the presence of external contacts. The key insight is that contact forces can redistribute at the multiple contact locations and thus provide a margin of stability to compensate for uncertainty in the gravitational forces and moments. Estimating this margin would allow us to generate trajectories which are robust to uncertainty in the parameters of the objects being manipulated.

Some embodiments are based on the realization that a robot would need to maintain the object in static equilibrium along a planned trajectory to ensure stability of the manipulation task. The contact forces at the two external contact points depend on the control force applied by the robot at the contact point between the object and the robot. Consequently, the frictional stability margin would depend on a certain static equilibrium pose of the object and thus would change over the entire manipulation trajectory.

Some embodiments of the proposed disclosure are based on the realization that the object needs to maintain slipping contact at the two external contact points during the pivoting manipulation. Consequently, the friction force always stays on the boundary of the friction cone during the manipulation trajectory. This leads to unique equality constraints for the robust optimization problem for the underlying manipulation problem. The presence of equality constraints leads to ill-posed optimization problem to generate a robust trajectory for manipulation. Consequently, there is a need for a novel optimization method for generating a robust control trajectory to compensate for the uncertainty during the two-point pivoting manipulation.

Some embodiments of the current disclosure are based on the realization that since the frictional stability varies along the manipulation trajectory during the two-point pivoting, one can estimate the minimum margin during the manipulation. To maximize the stability margin for this manipulation, we can maximize this minimum margin so that we can ensure manipulation in the presence of uncertainty of parameters of the objects being manipulated. This leads to a novel bilevel optimization problem which can be solved to compute a robust manipulation trajectory.

According to some embodiments of the present invention, a manipulation controller is provided for reorienting an object by a manipulator of a robotic system using external contacts of the object during manipulations. The manipulation controller may include an interface controller configured to acquire measurement data from sensors arranged on the robotic system; at least one processor; and a memory configured to store a computer-implemented method including a non-linear programming module, a non-linear optimization solver and an optimization module and non-linear static model representing input-output relationships between contact forces and movements with respect to predetermined objects, wherein the method uses the at least one processor coupled with the memory storing instructions implementing the method, wherein the instructions, when executed by the at least one processor, carry out at steps of the method, including: acquiring measurement data from vision sensors and force sensors arranged on the robotic system; determining an input-output relation for the object based on a nonlinear static model representing input-output relationships between contact forces and movements of the object on the workbench; representing interaction between the object and the manipulator using complementarity constraints to capture the contact state between the object and the manipulator; formulating a representation for frictional stability of the object based on the non-linear static model at the external contacts with the workbench; formulating a bilevel optimization problem so as to maximize the frictional stability over a position trajectory of the object being manipulated on the workbench; estimating, using the frictional stability, uncertainty value in physical parameters to be compensated by performing the bilevel optimization problem; solving the bilevel optimization problem using the non-linear optimization solver and generating control data with respect to a sequence of the contact forces being applied to the object by using the manipulator; and transmitting the control data that instruct the manipulator to perform the reorienting the object on the workbench according to the sequence of the contact forces.

Further, some embodiments of the present invention provide a computer-implemented manipulation method for performing desired manipulation by reorienting an object on a workbench by a manipulator of a robotic system using external contacts of the object with a part of the workbench. The method uses a processor coupled with a memory storing instructions implementing the method, wherein the instructions, when executed by the processor, carry out at steps of the method, including: acquiring measurement data from vision sensors and force sensors arranged on the robotic system; determining an input-output relation for the object based on a nonlinear static model representing input-output relationships between contact forces and movements of the object on the workbench; representing interaction between the object and the manipulator using complementarity constraints to capture the contact state between the object and the manipulator; formulating a representation for frictional stability of the object based on the non-linear static model at the external contacts with the workbench; formulating a bilevel optimization problem so as to maximize the frictional stability over a position trajectory of the object being manipulated on the workbench; estimating, using the frictional stability, uncertainty value in physical parameters to be compensated by performing the bilevel optimization problem; solving the bilevel optimization problem using a non-linear optimization solver and generating control data with respect to a sequence of the contact forces being applied to the object by using the manipulator; and transmitting the control data that instruct the manipulator to perform the reorienting the object on the workbench according to the sequence of the contact forces for obtaining a target position of the object.

BRIEF DESCRIPTION OF DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 13 shows number of successful pivoting attempts of gear 1 over 10 trials for the two different methods;

FIG. 15 shows the parameters of objects. m, l, w represent the mass, length, and the width of the object, respectively, where the first element in l, w are $l_1$, $w_1$ and the second element in l, w are $l_2$, $w_2$, respectively, shown in FIG. 14.

Figure 1A:
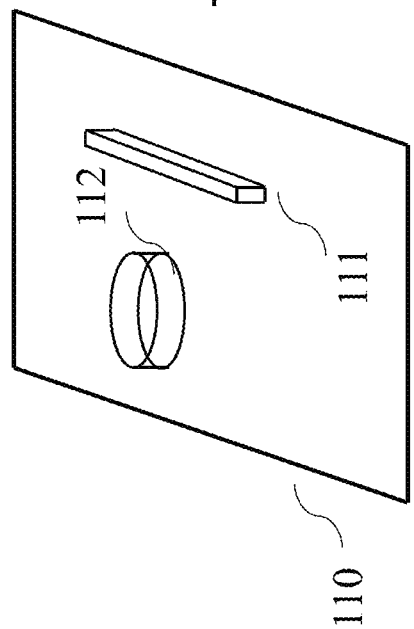
FIG. 1A and FIG. 1B show some manipulation scenarios where the parts are reoriented using an external contact surface by a manipulator arm, according to embodiments of the present invention.
Figure 1A:
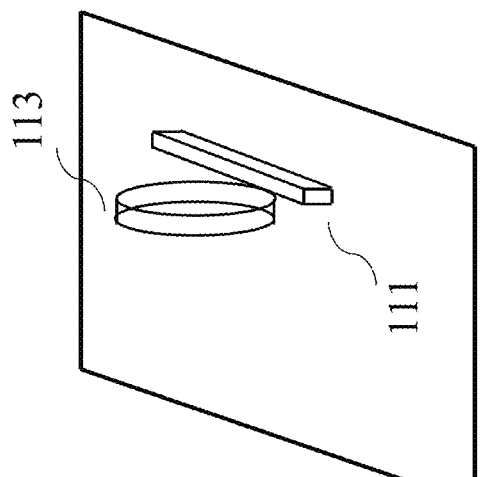

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Contacts are central to most manipulation tasks as they provide additional dexterity to robots to interact with their environment. Designing robust controllers for frictional interaction with objects with uncertain physical properties is challenging as the mechanical stability of the object depends on these physical properties. Inspired by this problem, we consider the task of pivoting manipulation in this paper. In particular, this invention considers the problem of re-orienting parts with uncertain mass and Center of Mass (CoM) location using pivoting. The current invention is related to ensuring mechanical stability via friction to compensate for uncertainty in the physical properties of the objects.

Some embodiments of the current disclosure are based on the realization that designing robust controllers for frictional interaction systems is challenging due to the hybrid nature of underlying frictional dynamics. Consequently, a lot of classical robust planning and control techniques are not applicable to these systems in the presence of uncertainties. While concepts of stability margin or Lyapunov stability have been well studied in the context of nonlinear dynamical system controller design, such notions have not been explored in contact-rich manipulation problems. This can be mostly attributed to the fact that a controller has to reason about the mechanical stability constraints of the frictional interaction to ensure stability. The mechanical stability closely depends on the contact configuration during manipulation, and thus a controller has to ensure that the desired contact configuration is either maintained during the task or it can maintain stability even if the contact sequence is perturbed. Analysis of such systems is difficult in the presence of friction as it leads to differential inclusion system.

Figure 1B:
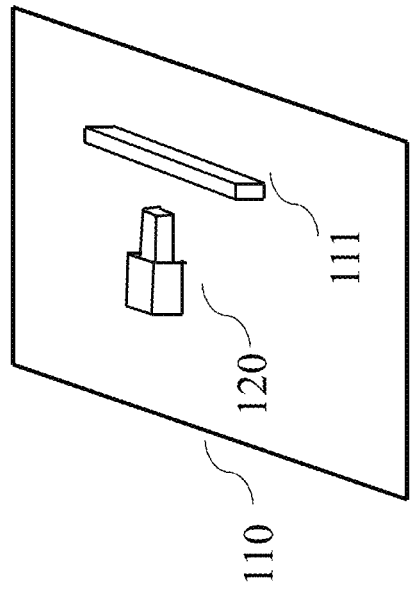
Figure 1B:
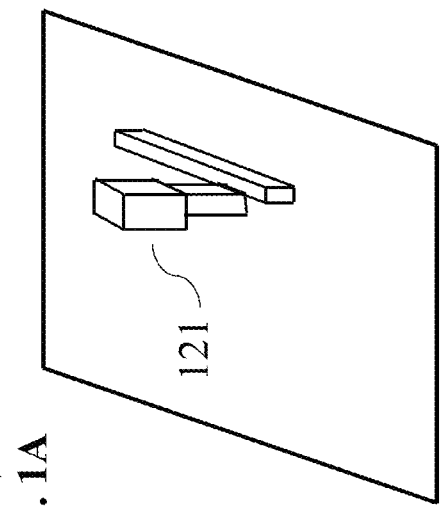
Figure 11A:
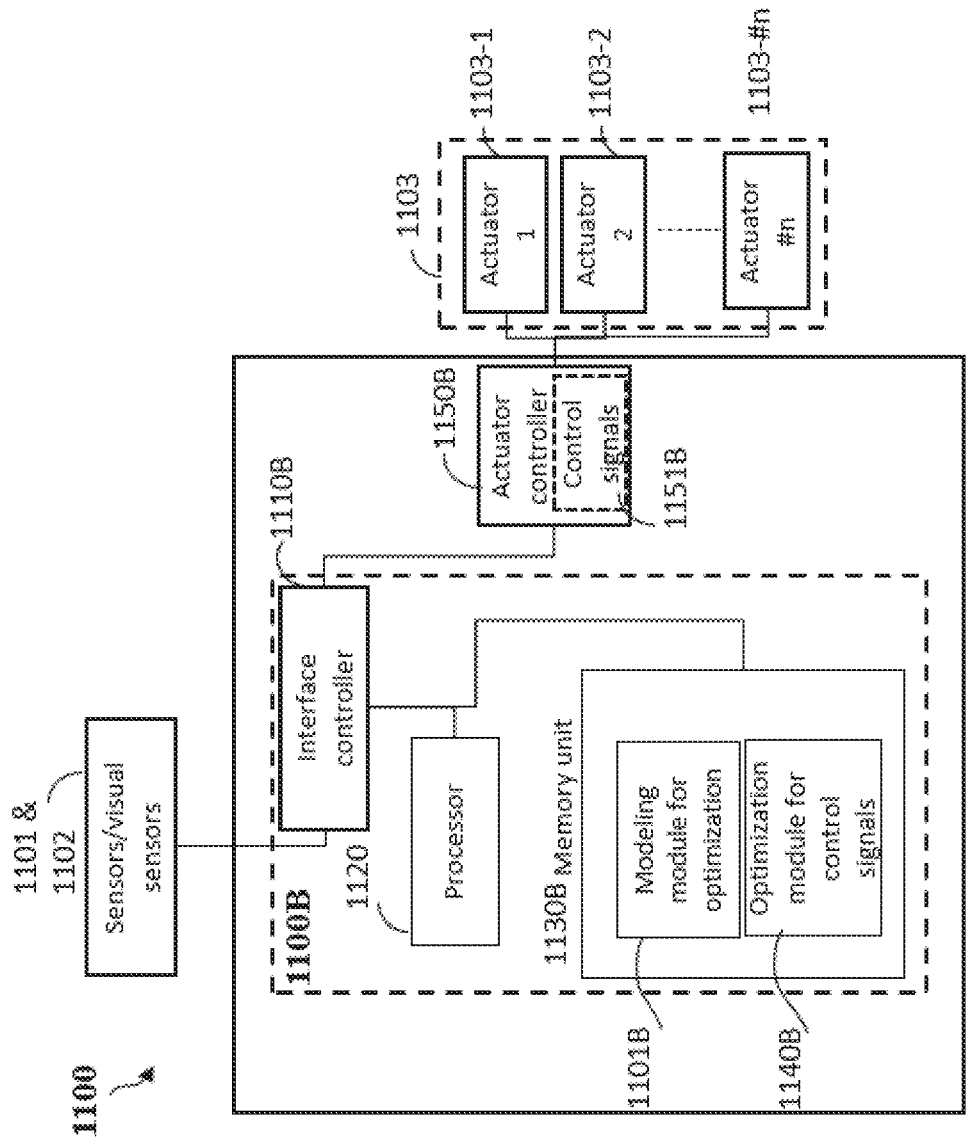
FIG. 11A shows a block diagram illustrating a controller configured to control an actuator system of a robot, according to some embodiments of the present invention.
Figure 11B:
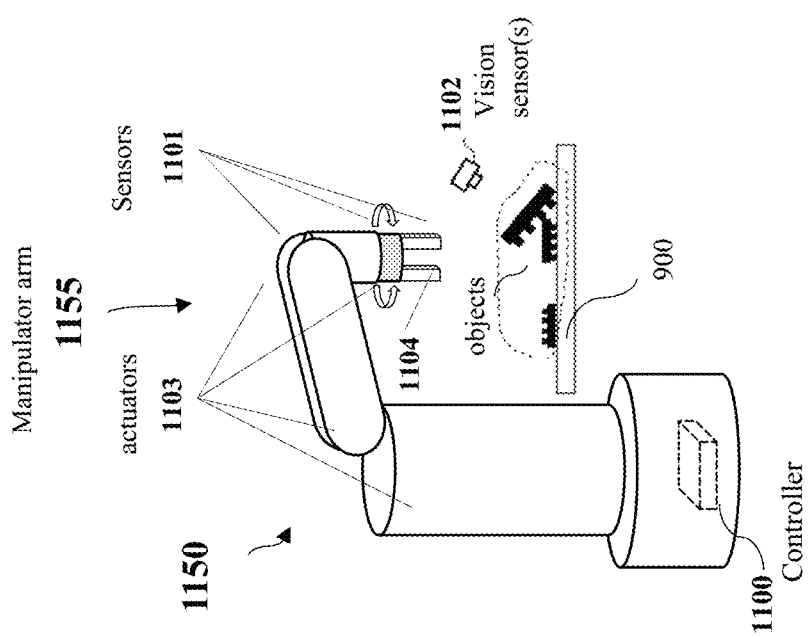
FIG. 11B shows the manipulation system to create the proposed robust trajectory optimization problem, according to embodiments of the present invention.

Some embodiments of the current disclosure are based on the realization that friction provides mechanical stability margin during a contact-rich task. We call the mechanical stability provided by friction as Frictional Stability. This frictional stability can be exploited during optimization to allow stability of manipulation in the presence of uncertainty. The present disclosure is related to pivoting manipulation task where the object being manipulated has to maintain slipping contact with two external surfaces. A robot can use this manipulation to reorient parts on a planar surface to allow grasping or assist in assembly by manipulating objects to a desired pose. FIG. 1A shows a table-top manipulation scenario where a circular object 112 is placed on a planar table surface (table-top) 110. The table-top is configured to have or attach an additional extrinsic contact surface 111. In some cases, the additional extrinsic contact surface 111 can be provided by a solid object such as a metal block(s) or the like, which has substantially flat surfaces to create contacts A and B and a mass that is sufficiently heavier than the object to be manipulated. The manipulation task of a robot arm of a robot may include to use the external contact surface 111 to pivot the object 112 from the initial pose 112 to the desired pose 113 according to a computer-implemented method stored in a memory 1130B of a controller (manipulator controller) 1100 of the robot 1150, as shown in FIGS. 11A and 11B. Similarly, in FIG. 1B the manipulation task of the robot 1150 can be to manipulate the pose of a peg 120 on a planar surface 110 to a desired pose 121 using the proposed pivoting manipulation.

Some embodiments of the present invention provide a computer-implemented method that uses a processor coupled with a memory storing instructions implementing the computer-implemented method. The processor is configured to carry out at steps of the instructions according to the method. The computer-implemented method is configured to operate the manipulator of the robot to perform pivoting where the object maintains slipping contact with two external surfaces.

Figure 2:
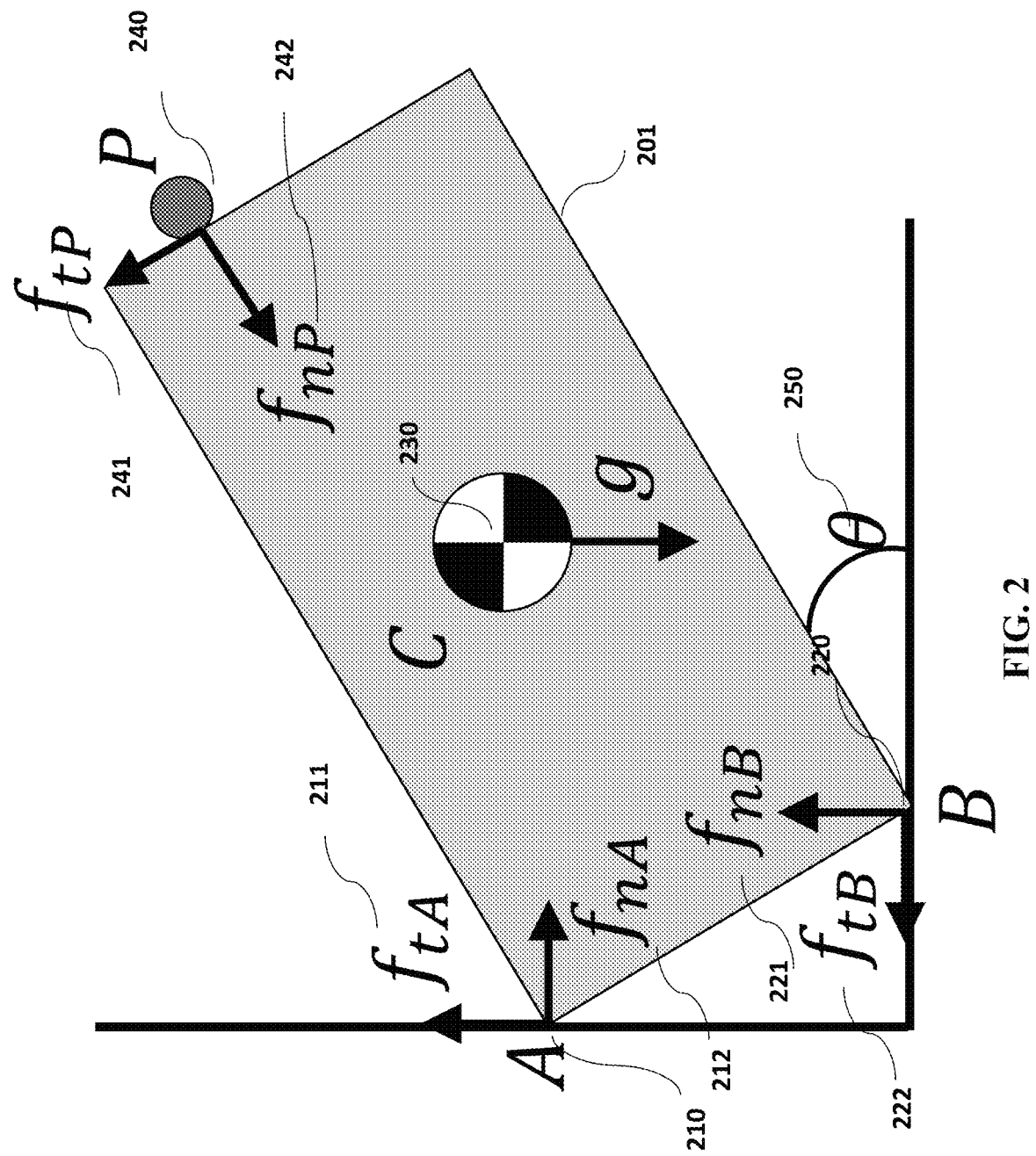
FIG. 2 shows the free-body diagram for the object in a certain contact configuration where the object is in contact with two external walls and a finger of a robotic manipulator, according to embodiments of the present invention.

FIG. 2 shows a free body diagram showing the static equilibrium of an object 201 against two external contact points A 210 and B 220 and the force exerted by the manipulator at a point P 240. The object experiences four forces corresponding to two friction forces $f_A$, $f_B$ from external contact points A 210 and B, 220 one control input $f_P$ from manipulator at point P 240, and gravity, mg at point C 230 where m is mass of the body. We denote $f_{ni}$, $f_{ti}$ as a normal force 211, 221 and friction force 212, 222 at point $\forall i$, $i=\{A, B\}$, respectively, defined in $\{F_W\}$. $f_{nP}$, $f_{tP}$ 242, 241 are normal and friction force at point P240 defined in $\{F_B\}$. Note that we define the $[f_x, f_y]^T = R[f_{nP}, f_{tP}]^T$ where R is a rotation matrix from $\{F_B\}$ to $\{F_W\}$. We denote x, y position at point in $\{F_W\}$ $\forall i$, $i=\{A, B, P\}$ as $i_x$, $i_y$, respectively. We denote y position of point P in $\{F_B\}$ as $p_y$. We define the angle of body with respect to x-axis as θ 250. The coefficient of friction at point $\forall i$, $i=\{A, B, P\}$ are $\mu_A$, $\mu_B$, $\mu_P$, respectively. This disclosure presents trajectory optimization formulation where we consider friction force variables $f_{ni}$, $f_{ti}$, contact point variables $i_x$, $i_y$, $\forall i$, $i=\{A, B, P\}$, θ, and $p_y$ at each time-step k denoted as $f_{k,ni}$, $f_{k,ti}$, $i_{k,x}$, $i_{k,y}$, $θ_k$, $p_{y,k}$. In the rest of the disclosure description, we remove k to represent variables for simplicity.

The static equilibrium conditions for the object can be represented by the following equations (note we consider the moment at point B by setting $B_x = B_y = 0$):

$$f_{nA} + f_{tB} + f_{xP} = 0, \quad (1)$$

$$f_{tA} + f_{nB} + mg + f_{yP} = 0, \quad (2)$$

$$A_x f_{tA} - A_y f_{nA} + C_x mg + P_x f_y - P_y f_x = 0 \quad (3)$$

We consider Coulomb friction law which results in friction cone constraints between the normal and the tangential contact force. The friction cone constraints at each of the two points A 210 and B 220 as follows:

$$|f_{tA}| \leq \mu_A f_{nA}, \ |f_{tB}| \leq \mu_B f_{nB}, \ f_{nA}, f_{nB} \geq 0 \quad (4)$$

Some embodiments of the current disclosure are based on the realization that the friction cone could be succintly represented using complementarity constraints. A complementarity constraint is a mathematical relation between functions $g(x) \geq 0$, $h(x) \geq 0$ mapping to the set of scalars that requires that either $g(x)=0$ or $h(x)=0$. This is compactly represented as $g(x) \geq 0 \perp h(x) \geq 0$. If the functions $g(x)$, $h(x)$ are vector functions of equal dimensions, then the notation $g(x) \geq 0 \perp h(x) \geq 0$ is understood to hold for each of the i-th components $g_i(x) \geq 0 \perp h_i(x) \geq 0$.

To describe sticking-slipping complementarity constraints, we have the following complementarity constraints at point $i=\{A, B\}$:

$$0 \leq \dot{p}_{i+} \perp \mu_i f_{ni} - f_{ti} \geq 0 \quad (5)$$

$$0 \leq \dot{p}_{i-} \perp \mu_i f_{ni} + f_{ti} \geq 0 \quad (6)$$

where the slipping velocity at point i follows $\dot{p}_i = \dot{p}_{i+} - \dot{p}_{i-}$. $\dot{p}_{i+}$, $\dot{p}_{i-}$ represent the slipping velocity along positive and negative directions for each axis, respectively. Some embodiments of the current disclosure are based on the realization that since we consider slipping contact during pivoting, we have equality constraints in friction cone constraints at points A,B:

$$f_{tA} = \mu_A f_{nA}, \ f_{tB} = -\mu_B f_{nB} \quad (7)$$

The above equations (1)-(7) provide the non-linear input-output relationship that determine the movement of the object 201 on a workbench up on the application of the contact forces (i.e, represent the input output relationship between the contact forces and the object movement).

Some embodiments of the disclosure are based on the realization that to realize stable pivoting, actively controlling position of point P 240 is important. Interactions between an object and a robot arm of the robotic system can be represented using complementarity constraints to capture the contact state between the object and the robot arm (i.e., the manipulator) of the robotic system. In some cases, the interactions are based on the contact state represented by the relation between a slipping velocity of the object on a table-top and the friction of the object with the table-top when the object is moved by the force applied by the robot arm. Thus, we consider the following complementarity constraints that represent the relation between the slipping velocity $\dot{p}_y$ at point P and friction cone constraint at point P:

$$0 \leq \dot{p}_{y+} \perp \mu_P f_{nP} - f_{tP} \geq 0 \quad (8)$$

$$0 \leq \dot{p}_{y-} \perp \mu_P f_{nP} + f_{tP} \geq 0 \quad (9)$$

where $\dot{p}_y = \dot{p}_{y+} - \dot{p}_{y-}$.

Figure 3A:
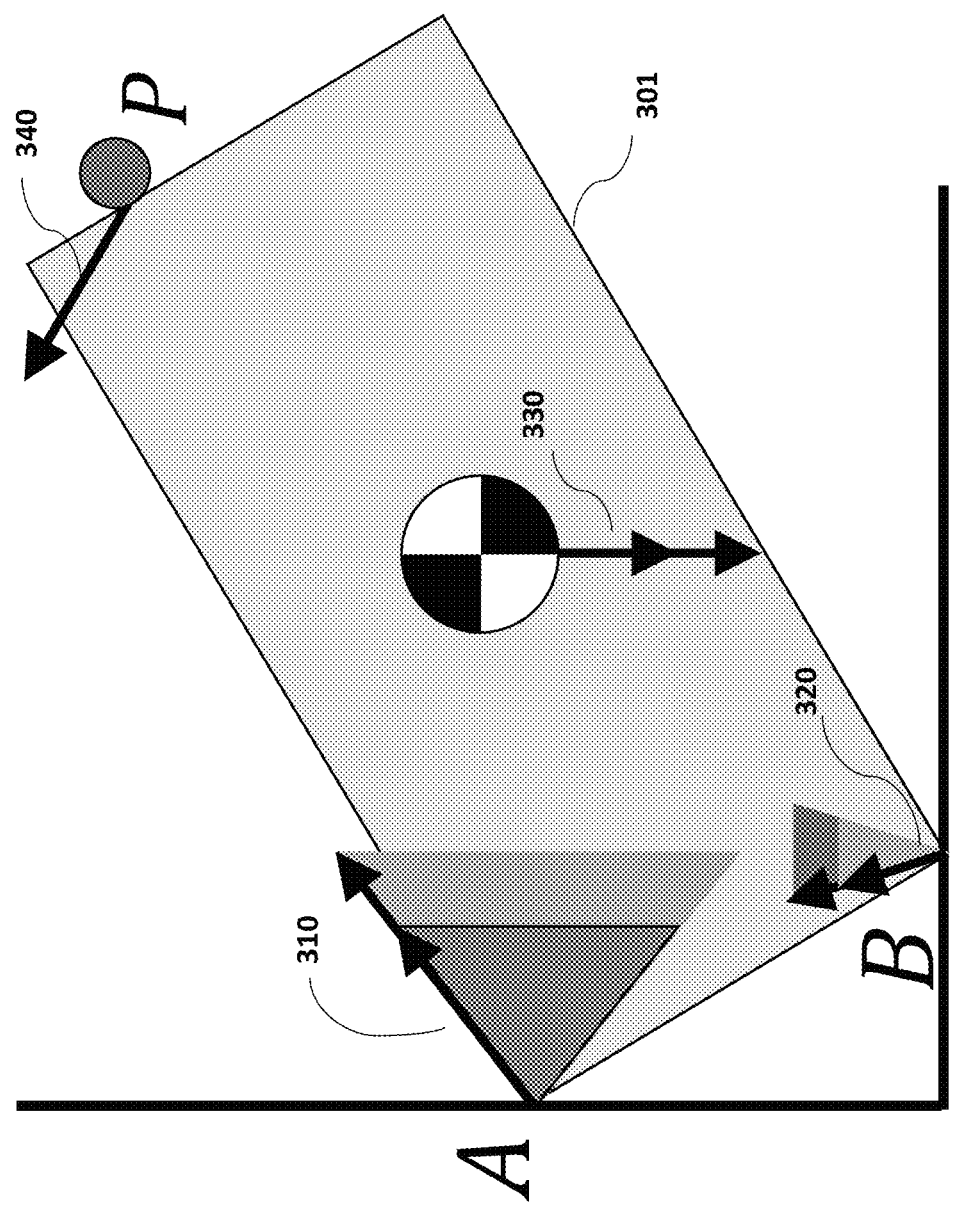
FIG. 3A shows the redistribution of contact forces along the boundary of the friction cone in the presence of uncertainty in the mass of the object, according to embodiments of the present invention.

FIG. 3A shows the variation in the contact forces experienced by an object 301 in the case when there exists uncertainty in the mass of the object. In the case when the actual mass 330 is lower than estimated, the friction force at point A 310 would increase while the friction force at point B 320 would decrease, compared to the nominal case. In contrast, suppose if the actual mass 330 of the body is heavier than that of what we estimate, then the body can tumble along point B in the clockwise direction. In this case, we can imagine that the friction force at point A 310 would decrease while the friction force at point B 320 would increase. However, as long as the friction forces are non-zero, the object can stay in contact with the external environment.

Figure 3B:
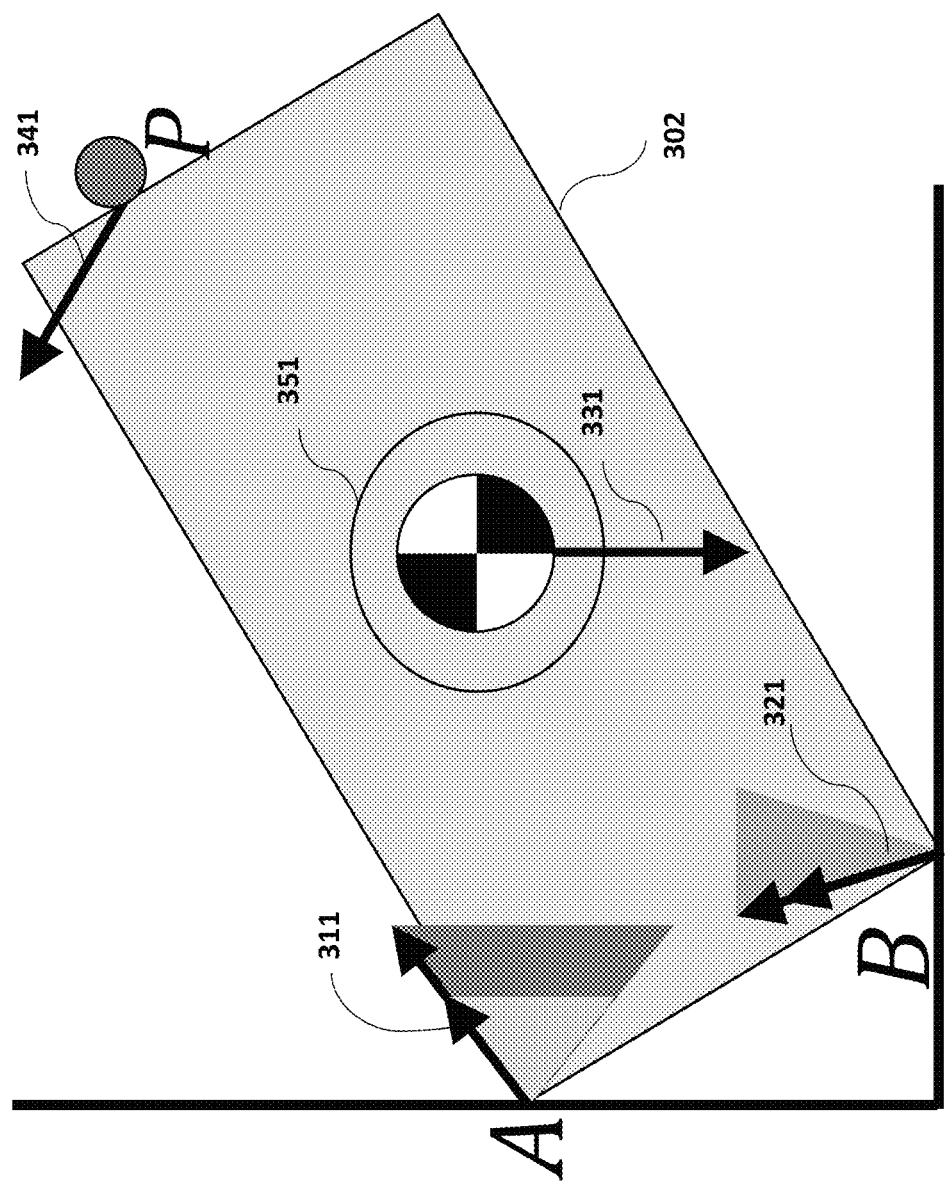
FIG. 3B shows the redistribution of contact forces along the boundary of the friction cone in the presence of uncertainty in the center of mass location of the object, according to embodiments of the present invention.

Similar arguments could be made for uncertainty in Center of Mass (CoM) location. FIG. 3B shows the case where the CoM location 351 is uncertain but the mass in 331 is known. This would also lead to redistribution of contact forces at points A 311 and B 321 compared to the normal.

Some embodiments of the current disclosure are based on the realization that the friction forces can re-distribute at the two contact locations and thus provide a margin of stability to compensate for uncertain gravitational forces and moments. We call this margin as frictional stability.

Figure 4:
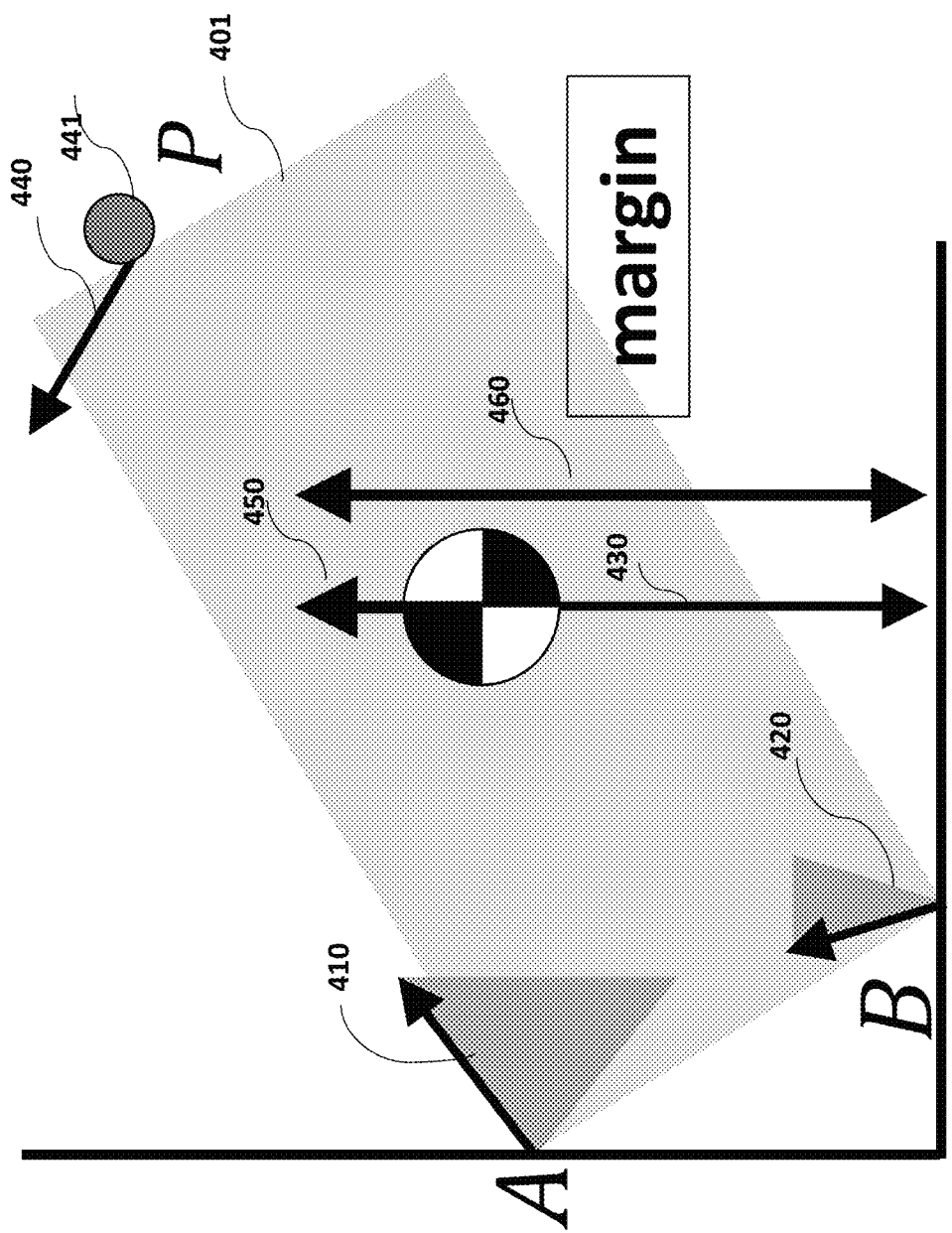
FIG. 4 shows the margin of uncertainty in mass of the object that can be compensated by redistribution of contact forces, according to embodiments of the present invention.

FIG. 4 shows the idea of the frictional stability margin 460 for the case of uncertainty in mass 450,430 for an object 401. The control contact force 440 is applied on the object 401 at the point of contact 441. Note that the contact forces 410 and 420 could redistribute from the nominal contact forces to compensate for uncertainty in the mass of the object 401.

We denote ε as uncertain weight with respect to the estimated weight. Also, to emphasize that we consider the system under uncertainty, we put superscript ε for each friction force variable. Thus, the static equilibrium conditions in (1)-(3) can be rewritten as:

$$f_{nA}^\varepsilon + f_{tB}^\varepsilon + f_{xP} = 0, \tag{10}$$

$$f_{tA}^\varepsilon + f_{nB}^\varepsilon + (mg+\varepsilon) + f_{yP} = 0, \tag{11}$$

$$A_x f_{tA}^\varepsilon - A_y f_{nA}^\varepsilon + C_x(mg+\varepsilon) + P_x f_y - P_y f_x = 0 \tag{12}$$

Then, using the above equations (11)-(12), we obtain:

$$f_{nA}^\varepsilon = \frac{-C_x(\text{mg}+\varepsilon) - P_x f_y + P_y f_x}{\mu_A A_x - A_y} \tag{13}$$

To ensure that the body maintains contact with the external surfaces, we would like to enforce that the body experience non-zero normal forces at the both contacts. To realize this, we have $f_{nA}^\varepsilon \geq 0$, $f_{nB}^\varepsilon \geq 0$ as conditions that the system needs to satisfy. Consequently, by simplifying (13), we get the following:

$$\varepsilon \geq \frac{P_y f_x - P_x f_y - C_x \text{mg}}{C_x}, \quad \text{if } C_x > 0, \tag{14}$$

$$\varepsilon \leq \frac{P_y f_x - P_x f_y - C_x \text{mg}}{C_x}, \quad \text{if } C_x < 0 \tag{15}$$

Note that the upper-bound of s means that the friction forces can exist even when we make the mass of the body lighter up to ε/g. The lower-bound of ε means that the friction forces can exist even when we make the mass of the body heavier up to ε/g.

Some embodiments of the disclosure are based on the realization that (13)-(14) gives either upper- or lower-bound of ε for $f_{nA}^\varepsilon$ according to the sign of $C_x$ (the moment arm of gravity). This is because the uncertain mass would generate an additional moment along with point B in the clock-wise direction if $C_x > 0$ and in the counter clock-wise direction if $C_x < 0$. If $C_x = 0$, we have unbounded range for ε, meaning that the body would not lose contact at point A no matter how much uncertainty exists in the mass.

(13)-(14) can be reformulated as an inequality constraint:

$$C_x(\varepsilon - \varepsilon_A) \geq 0 \tag{16}$$

where $$\varepsilon_A = \frac{P_y f_x - P_x f_y - C_x \text{mg}}{C_x}.$$

Some embodiments of the disclosure are based on the realization that we can derive condition for s based on $f_{nB}^\varepsilon \varepsilon 0$ from (7), (10), and (11):

$$\varepsilon \leq \mu_A f_x - f_y - mg \tag{17}$$

Another important realization is that we only have upper-bound on s based on $f_{nB}^\varepsilon \geq 0$, meaning that the contact at point B cannot be guaranteed if the actual mass is lighter than $\mu_A f_x - f_y - mg$.

Some embodiments of the disclosure are based on the realization that we can derive similar bounds for uncertainty in CoM location. We denote dx,dy as residual CoM locations with respect to the estimated CoM location in $\{F_B\}$ coordinate, respectively. Thus, the residual CoM location in $x_W$, $y_W$, $dx_W$, $dy_W$, are represented by $dx_W = d\cos(\theta+\theta_d)$, $dy_W = d\sin(\theta+\theta_d)$, where $$d = \sqrt{dx^2 + dy^2}, \theta_d = \arctan\frac{dy}{dx}.$$

For notation simplicity, we use r to represent $dx_W$. In this paper, we put superscript r for each friction force variables. Then, the static equilibrium conditions in (1)-(3) can be rewritten as follows:

$$f_{nA}^r + f_{tB}^r + f_{xP} = 0, \tag{18}$$

$$f_{tA}^r + f_{nB}^r + mg + f_{yP} = 0, \tag{19}$$

$$A_x f_{tA}^r - A_y f_{nA}^r + (C_x + r)mg + P_x f_y = P_y f_x \tag{20}$$

Then, using (4) in (18)-(20), we obtain:

$$r \leq \frac{P_y f_x - P_x f_y}{mg} - C_x, \tag{21}$$

$$r \geq -C_x - \frac{\frac{\mu_A A_x - A_y}{1+\mu_A}(-f_x - f_y - mg) - P_y f_x + P_x f_y}{mg} \tag{22}$$

where (21), (22) are obtained based on $f_{nA}^r \geq 0$, $f_{nB}^r \geq 0$, respectively. Equation (21) means that the object would lose contact at A if the actual CoM location is more to the right than our expected CoM location while the object would lose the contact at B if the actual CoM location is more to the left.

The above equations (14)-(15) and (21)-(22) represent the non-linear relationship for frictional stability of the object by using redistribution of contact forces for static equilibrium of the object.

Some embodiments of the current disclosure are based on the realization that one needs to design and solve an optimal control problem for the manipulation task of pivoting the object. In some cases, the contact state and the object state may be captured by using a vision sensor(s) 1102 and the sensors 1101 such as tactile sensors. The object state is represented by the angular position of the object θ 250 in FIG. 2, which can be measured using vision sensors. Note that there are two kinds of contact made by the object during the manipulation operation. There are two contacts between the object and the external surface that we can call extrinsic contacts. For instance, the locations are illllustrated as the points A and B in FIGS. 2, 3A, 3B, 4 and 7. There is one point of contact between the manipulator and the object. For instance, this is shown as point P in FIGS. 2, 3A, 3B, 4 and 7. The contact state can be measured by using tactile as well as vision sensors either by direct measurement or by using an estimation method. The tactile senors 1101 and vision sensors 1102 can be used to measure the contact state between the manipulator and the object, and monitor slipping between the object and the manipulator. These sensors can also be used to measure the contact state between the object and the external contact surface (the extrinsic contacts) and monitor slipping at the same.

The purpose of our optimal control is to regulate the contact state and object state simultaneously given by:

$$\min_{x,u,f} \sum_{k=0}^{N-1} (x_k - x_g)^T Q(x_k - x_g) + u_k^T R u_k \tag{23}$$

$$\text{s.t. } i_{k,x}, i_{k,y} \in FK(x), (1)-(3),(7),(8)-(9) \tag{24}$$

$$x_0 = x_s, x_N = x_g, x_k \in X, u_k \in \bigcup, 0 \leq f_{k,ni} \leq f_u \tag{25}$$

where $x_k=[\theta_k,p_{k,y}]^T$, $u_k=[f_{k,nP}, f_{k,tP}]^T$, $f_k=[f_{k,nA}, f_{k,nB}]^T$, $Q=Q^T\geq 0$, $R=R^T>0$.

The function FK represents forward kinematics to specify each contact point i and CoM location. X and ∪ are convex polytopes, consisting of a finite number of linear inequality constraints. $f_u$ is an upper-bound of normal force at each contact point.

In the above equations, the matrices Q and R are cost matrices for state and control input that are provided to the optimization routine by a user based on the objective of the manipulation problem. The constraints for the optimization problem (23) specified in (24) are obtained by the conditions for static equilibrium of the object in an arbitrary contact configuration as well the kinematic constraints for the manipulation problem. The parameters of these static equilibrium conditions would include the mass of the object and the coefficient of friction for the different surfaces. Mass of the object being manipulated will be provided by the user with some uncertainty. However, the proposed method needs perfect knowledge of the friction coefficient. These can be obtained by performing some system identification experiments using the object and can be provided like in FIG. 15. The kinematic constraints require the geometric description of the object which can be obtained using vision sensors 1120.

The output of the optimization algorithm is the optimal sequence of control, state and contact force trajectory as is shown in the formulation in Equation (23).

Some embodiments of the current disclosure are based on the realization that we need to consider incorporate frictional stability in trajectory optimization formulation to obtain robustness. In some cases, the frictional stability defines the extent to which multiple points of contact can compensate for gravitational force and moments in the presence of uncertainty in the mass and CoM location.

An important realization in the disclosure is that optimization problem would be ill-posed if we naively add (10)-(12) and/or (18)-(22) to (23)-(25) since there is no u to satisfy all uncertainty realization in equality constraints. Thus, the present disclosure presents a novel optimization formulation that leads to a formulation that can be solved using non-linear programming softwares. For instance, the non-linear programming software may be a non-linear optimization solver, such as Interior Point OPTimizer (IPOPT) and Sparse Nonlinear OPTimizer (SNOPT).

Figure 5:
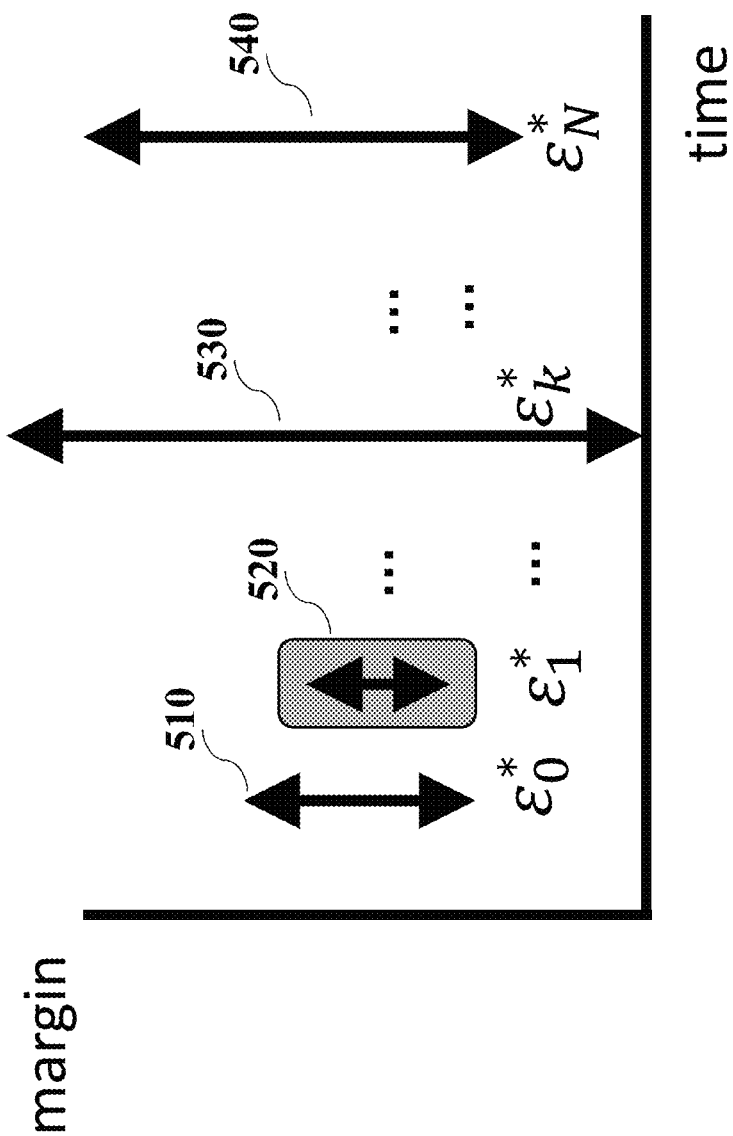
FIG. 5 shows the variation in the stability margin that changes over a certain manipulation trajectory with time, according to embodiments of the present invention.

Some embodiments are based on the realization that we can plan to find an optimal nominal trajectory that can ensure external contacts under mass or CoM location uncertainty. In other words, we aim at maximizing the worst-case stability margin over the trajectory given the maximal frictional stability at each time-step k. An important realization in the disclosure is that the frictional stability margin varies over the trajectory of manipulation as the stability conditions for the object at different poses change over the trajectory of the object. FIG. 5 shows the idea of changing stability margins with time over the manipulation amrgin. As shown in the Figure, we can obtain a sequence of stability margin $\epsilon_0^*, \epsilon_1^*, \ldots, \epsilon_k^*, \ldots, \epsilon_N^*$ 510, 520, 530, 540 with time at different points along the trajectory of the object. Note that the minimum in the sequence appears at 520.

Figure 6:
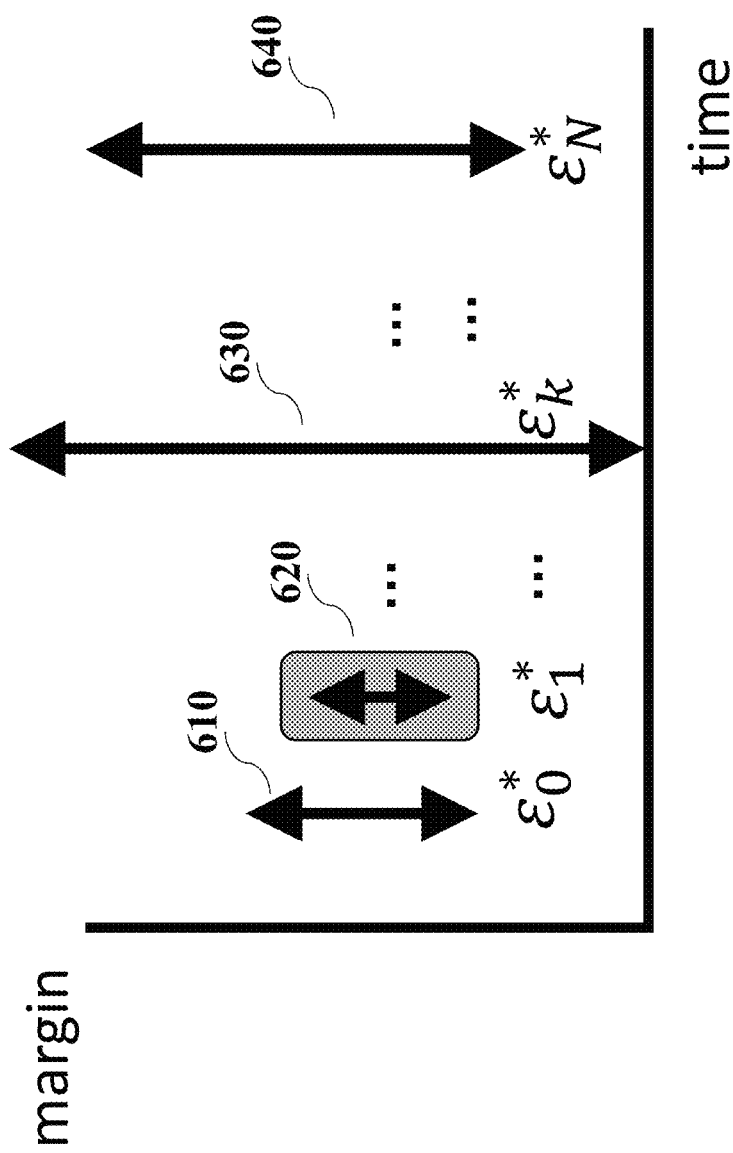
FIG. 6 shows the max-min optimization problem that should be solved to provide robustness to manipulation in the presence of uncertainties in the parameters of the object being manipulated, according to embodiments of the present invention.

FIG. 6 shows the optimization problem that we propose to solve in the current disclosure. Note that over the trajectory of the object, we obtain a sequence of stability margins $\epsilon_0^*, \epsilon_1^*, \ldots, \epsilon_k^*, \ldots, \epsilon_N^*$, 610, 620, 630, 640 along the manipulation trajectory. The proposed maximization problem 602 maximizes the minimum stability margin that an object can incur during a manipulation task. Such an optimization routine yields an optimal sequence of states, inputs and contact forces experienced by the object during manipulation 601. Thus, we maximize the following objective function:

$$\min_k \varepsilon_{k,+}^* - \max_k - \varepsilon_{k,-}^* \quad (26)$$

where $\varepsilon_{k,+}^*, \varepsilon_{k,-}^*$ are non-negative variables. Note that $\varepsilon_{k,+}^*, \varepsilon_{k,-}^*$ are the largest uncertainty in the positive and negative direction, respectively, at instant k given x, u, f, which results in nons-zero contact forces (i.e., stability margin).

Figure 7:
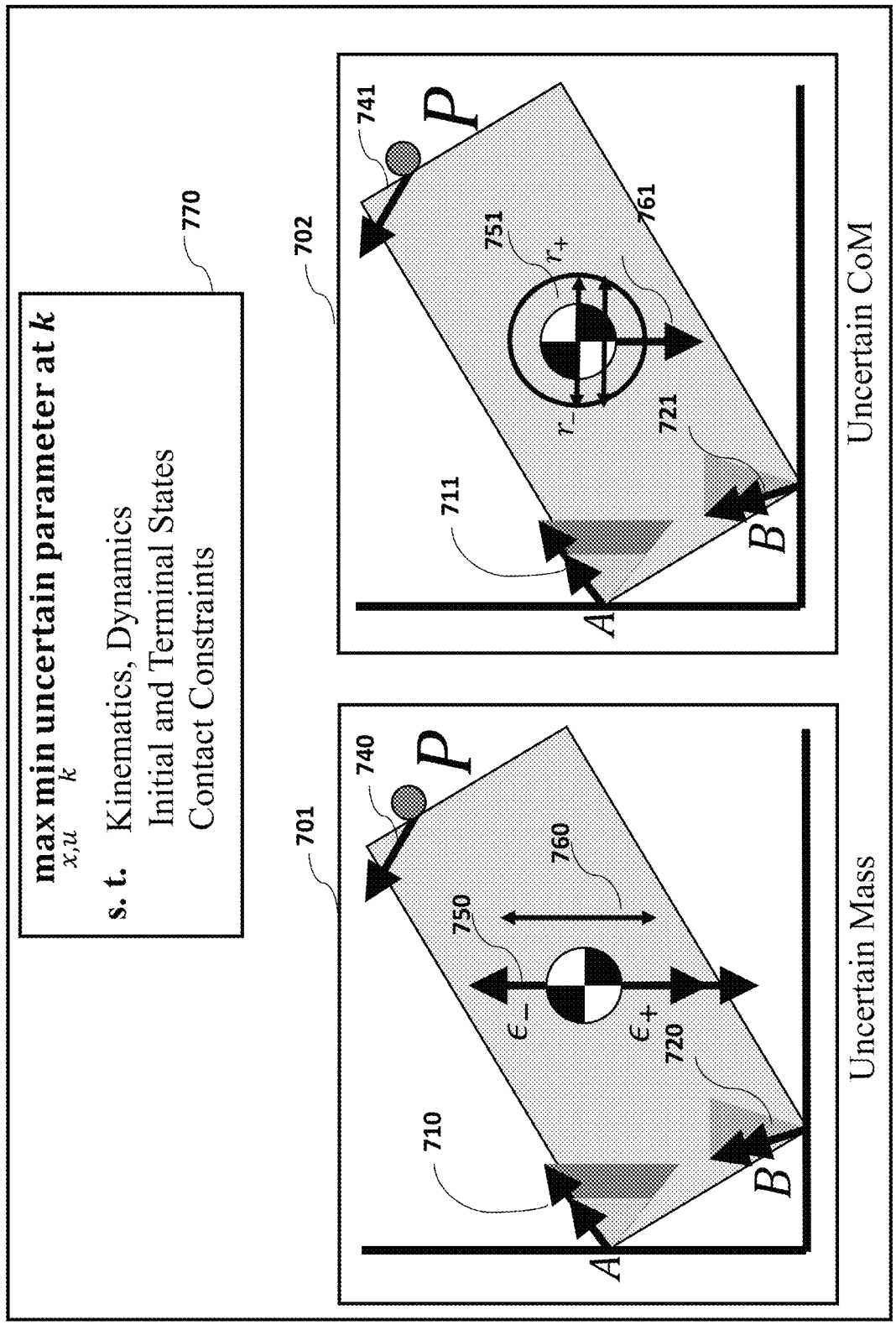
FIG. 7 shows the conceptual visualization of the bilevel optimization problem that needs to be solved in order to compensate for uncertainties in the mass and center of mass location of the object, according to embodiments of the present invention.

Some embodiments of the current disclosure are based on the realization that the robust manipulation leads to a bilevel optimization problem. FIG. 7 shows the method of the proposed bilevel optimization problem 770. In the case of the uncertain mass 701, in the presence of a control force 740, the contact forces 710 and 720 redistribute to compensate for the uncertainty in the mass of the object 760. Note that the uncertainty (uncertainty value) can exist in the positive or the negative direction 750. Similarly for the case of the uncertain CoM location 702 and fixed mass 761, the contact forces 711, 721 will redistribute to compensate for the uncertainty 751 in the CoM location. Depending on the kind of uncertainty, the bilevel optimization problem maximizes the minimum frictional stability over the entire manipulation trajectory.

The optimization problem (26) calculates the smallest stability margin over time-horizons by subtracting the stability margin along the positive direction from that along the negative direction. Hence, we formulate a bilevel optimization problem which consists of two lower-level optimization problems as follows:

$$\max_{x,u,f,\varepsilon_+^*,\varepsilon_-^*} \left( \min_k \varepsilon_{k,+}^* - \max_k - \varepsilon_{k,-}^* \right) \quad (27)$$

$$\text{s.t. } (24),(25) \quad (28)$$

$$\varepsilon_{k,+}^* \in_{\varepsilon_{k,+}} \{\varepsilon_{k,+} : A_k \varepsilon_{k,+} \leq b_k, \varepsilon_{k,+} \geq 0\}, \quad (29)$$

$$\varepsilon_{k,-}^* \in_{\varepsilon_{k,-}} \{\varepsilon_{k,-} : -A_k \varepsilon_{k,-} \leq b_k, \varepsilon_{k,-} \geq 0\} \quad (30)$$

where $A_k \in R^{2\times 1}$, $b_k \in R^{2\times 1}$ represent inequality constraints in equations (16) and (17). $A_k \varepsilon_{k,+} \leq b_k$, $\varepsilon_{k,+} \geq 0$, and $-A_k \varepsilon_{k,-} \leq b_k$, $\varepsilon_{k,-} \geq 0$ represent the lower-level constraints for each lower-level optimization problem while (24), (25) represent the upper-level constraints. $\varepsilon_+, \varepsilon_-$ are the lower-level objective functions while $\min_k \varepsilon_{k,+}^* - \max_k - \varepsilon_{k,-}^*$, is the upper-level objective function. $\varepsilon_{k,+}, \varepsilon_{k,-}$ are the lower-level decision variables of each lower-level optimization problem while x, u, f, $\varepsilon_+^*, \varepsilon_-^*$ are the upper-level decision variables.

Some embodiments are based on the realization that (27)-(30) considers the largest one-side frictional stability margin along positive and negative direction at k. Therefore, by solving these two lower-level optimization problems, we are able to obtain the maximum frictional stability margin along positive and negative direction. Thus by solving the bilevel optimization problem we are able to estimate the largest uncertainty that can be compensated by the proposed frictional stability. The advantage of (27)-(30) is that since the lower-level optimization problem are formulated as two linear programming problems, we can efficiently solve the entire bilevel optimization problem using the Karush-Kuhn-Tucker (KKT) condition as follows:

$$w_{k,+,j}, w_{k,-,j} \geq 0, C_k \varepsilon_{k,+} \leq d_k, E_k \varepsilon_{k,-} \leq d_k, \quad (31)$$

$$w_{k,+,j}(C_k \varepsilon_{k,+} - d_k)_j = 0, \quad (32)$$

$$w_{k,-,j}(E_k \varepsilon_{k,-} - d_k)_j = 0, \quad (33)$$

$$\nabla(-\varepsilon_{k,+}) + \sum_{j=1}^{3} w_{k,+,j} \nabla(C_k \varepsilon_{k,+} - d_k)_j = 0, \quad (34)$$

$$\nabla(-\varepsilon_{k,-}) + \sum_{j=1}^{3} w_{k,-,j} \nabla(E_k \varepsilon_{k,+} - d_k)_j = 0 \quad (35)$$

where $C_k = [A_k^T, -1]^T \in R^{3 \times 1}$, $d_k = [b_k^T, 0]^T \in R^{3 \times 1}$, $E_k = [-A_k^T, -1]^T \in R^{3 \times 1}$. $w_{k,+,j}$ is Lagrange multiplier associated with $(C_k \varepsilon_{k,+} \leq d_k)_j$, where $(C_k \varepsilon_{k,+} \leq d_k)_j$ represents the j-th inequality constraints in $C_k \varepsilon_{k,+} \leq d_k$. $w_{k,-,j}$ is Lagrange multiplier associated with $(E_k \varepsilon_{k,+} \leq d_k)_j$. Using the KKT condition and epigraph trick, we eventually obtain a single-level large-scale nonlinear programming problem with complementarity constraints:

$$\max_{x, u, f, \varepsilon_+^*, \varepsilon_-^*} (t_+ + \alpha t_-) \quad (36)$$

$$\text{s.t. } (24), (25), (31)-(35) \quad (37)$$

$$t_+ \leq \varepsilon_{k,+}, t_- \leq \varepsilon_{k,-}, \forall k \quad (38)$$

where α is a weighting scalar. Note that we derive kkt_convertion for the case with a uncertain mass parameter but this formulation can be easily converted to the case where uncertainty exists in CoM location by replacing $A_k, b_k$ in (27)-(30) with (21)-(22). Therefore, by solving tractable (36)-(38), we can efficiently generate robust trajectories that are robust against uncertain mass and CoM location parameters. Since (36)-(38) is a non-linear optimization problem, the proposed bi-level optimization problem is solved using a nonlinear optimization solver (e.g., IPOPT) which provides a sequence of forces that can be applied by the manipulator arm to control the object from the initial pose to the desired pose.

Figure 8:
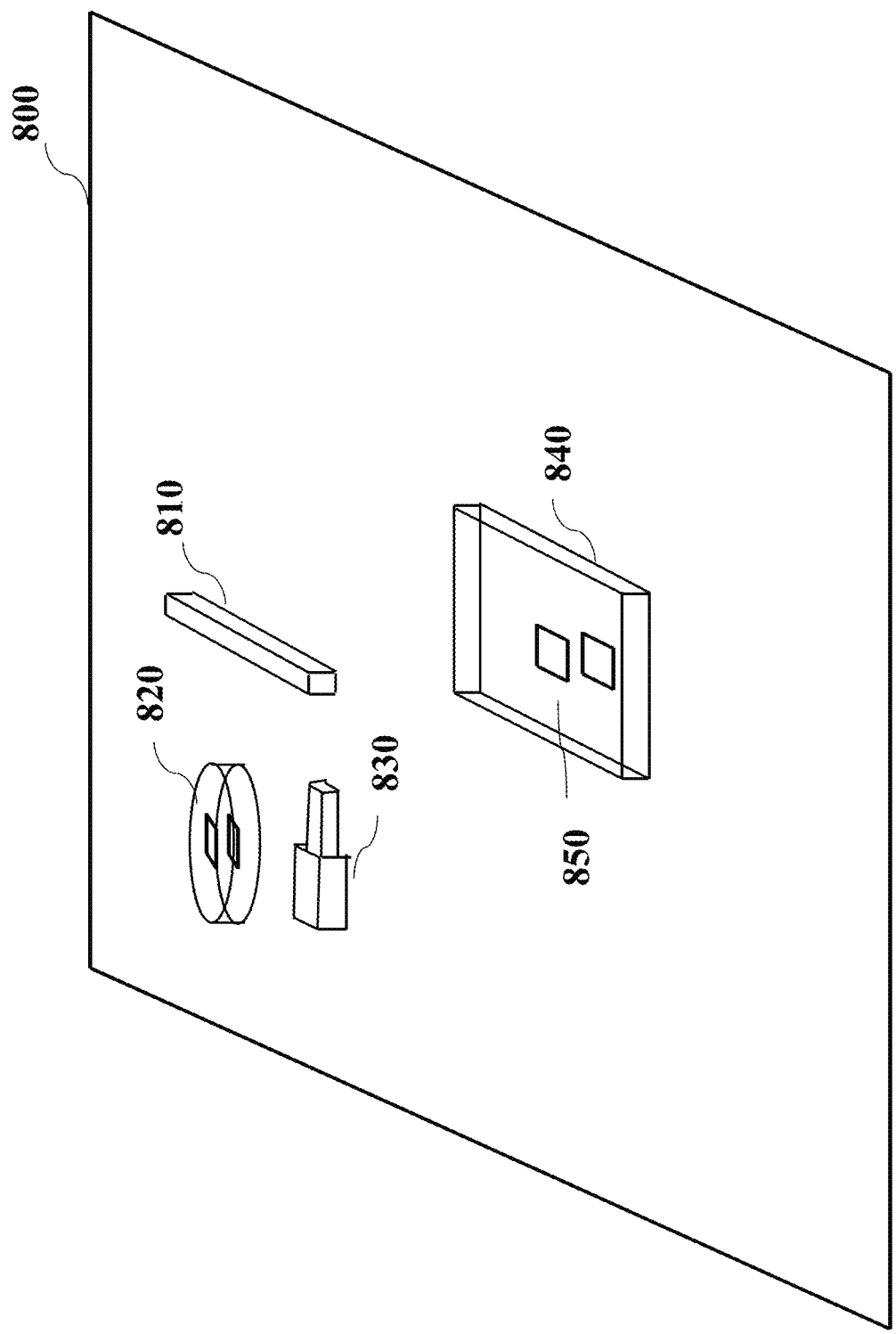
FIG. 8 shows an assembly scenario where a robotic system is provided with some parts on a table-top with an additional contact surface where the robot could assemble the desired object using the pivoting manipulation, according to embodiments of the present invention.

FIG. 8 shows an assembly manipulation scenario where a robot has to perform a table-top 800 manipulation to assemble a product 840 using the parts 820, 830. The desired task is that the peg 830 has to be inserted in hole 850 and then the circular gear 820 has to be inserted on top of the peg 830. However, the robot can not grasp the circular gear 820 in the current configuration and it can not insert the peg 830 in the current pose. The planar table 800 has an external vertical planar surface 810 which is either fixed or too heavy that it can not be moved by the robot. Then the robot uses the proposed optimization method to compute a sequence of control forces so that it can pivot 820 and 830 against the surface 810. Then the robot can grasp 830 in the correct insertion pose and perform insertion in the hole 850. Then the robot can grasp the circular part 820 to insert on top on the peg 830 (which is already in hole 830).

Figure 9:
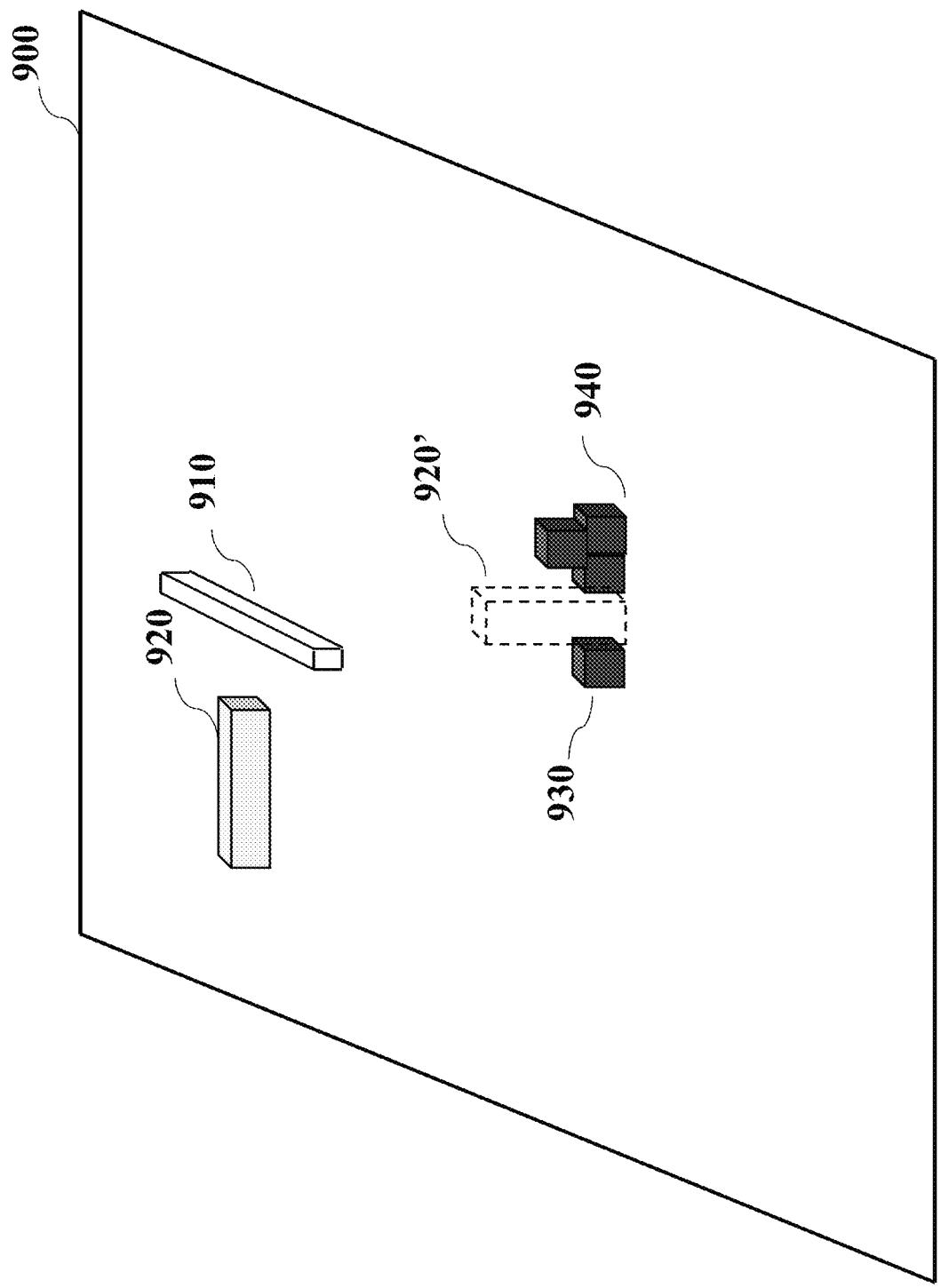
FIG. 9 shows a packing scenario where a robotic system is provided with blocks of different size which needs to be stacked in a desired fashion using the proposed pivoting manipulation, according to embodiments of the present invention.

FIG. 9 shows a packing scenario on a planar table-top 900, where the manipulation task is to pack the block 920 between the blocks 930 and 940 in the pose 920. As could be seen in the figure, the robot needs to manipulate the pose of the block 920 before it can be packed in the desired pose 920'. The planar table 900 has an external vertical planar surface 910 which is either fixed or too heavy that it can not be moved by the robot. The robot then uses the proposed optimization method in the disclosure to compute the sequence of optimal control forces (sequence of the contact forces) to pivot the object 920 against 910 so that it can manipulate the pose of 920 to the desired pose 920'.

In the following, an example of a computer-implemented method for robust optimization for pivoting manipulation which can be used to re-orient parts during a robotic assembly process is described by referring FIG. 10 and FIGS. 11A and 11B.

Figure 10:
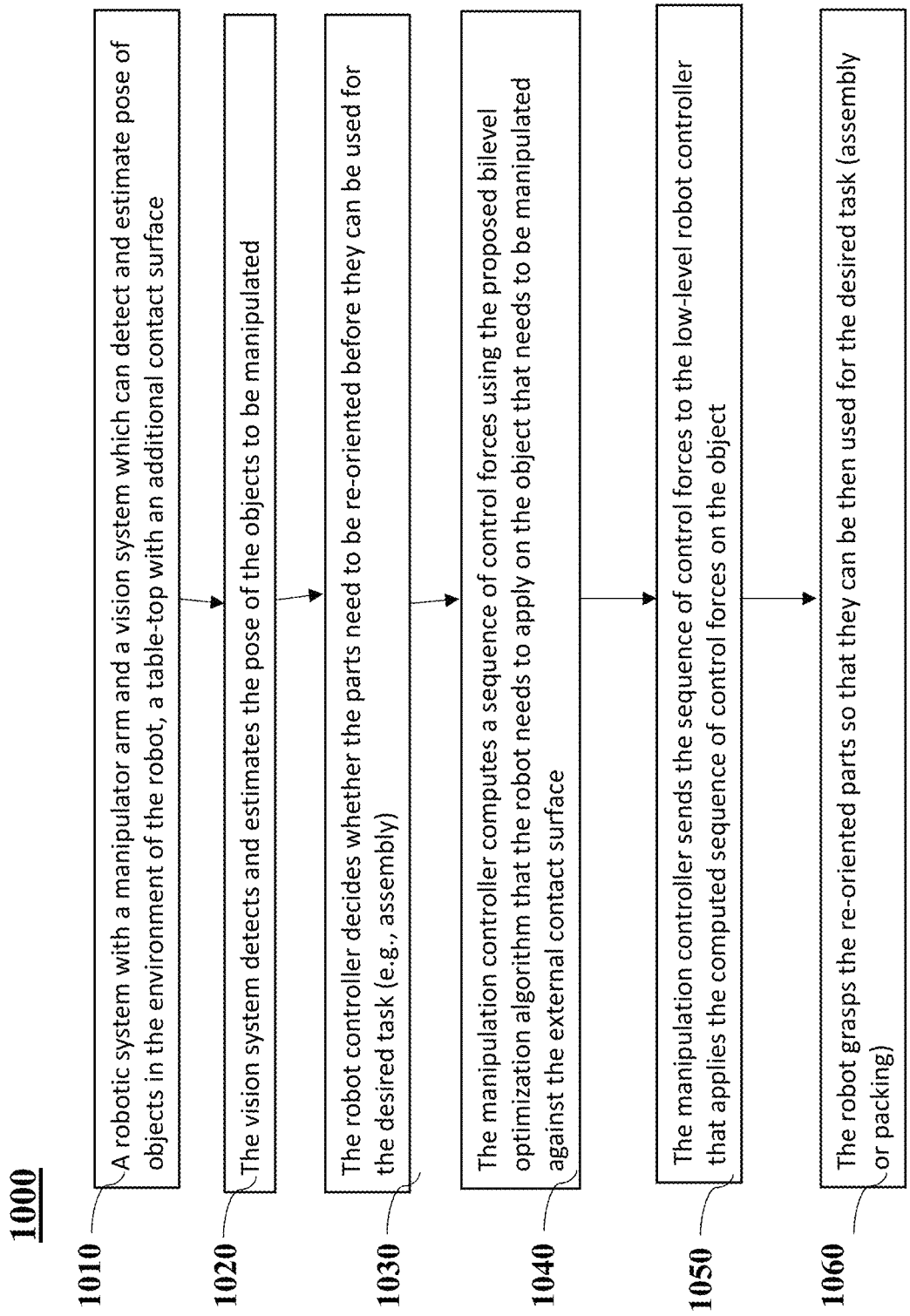
FIG. 10 shows the sequence of steps used by the manipulation system to perform a desired manipulation task using the proposed method, according to embodiments of the present invention.

FIG. 10 shows the computer-implemented method describing the sequence of steps used by the manipulation system 1155 of a robotic system 1150 to perform a desired manipulation task according to embodiments of the present invention. In some case, the robotic system 1150 may be referred to as a robot 1150.

The robotic system 1150 (FIG. 11B) includes a manipulator arm 1155 and force sensors 1101 arranged on the manipulator arm 115 and a vision system 1102 (at least one camera). The force sensors 1101, which can be referred to as at least one force sensor, are configured to detect the force implemented by the manipulator arm 1155 on the object at the point of contact between the object and the manipulator. The vision system 1102 may be at least one camera or cameras, depth cameras, range cameras or the like. The vision system 1102 is arranged at a position such that the vision system 1102 can observe the object state representing the positional relationship among the object, the table-top and additional contact surface. The vision system 1102 is configured to estimate pose of objects on the table-top 900 with an additional contact surface 910 in the environment of the robotic system 1150.

The vision system 1102 detects and estimates the pose of the objects to be manipulated in step 1020. The robot controller 1100 is configured to determine whether the parts need to be re-oriented before they can be used for the desired task (e.g., assembly) in step 1030. The controller 1100 is configured to compute a sequence of control forces applied to the object using the bilevel optimization algorithm. The robot 1150 applies the sequence of control forces (sequence of the contact forces) to the object against the external contact surface (e.g. 810) in step 1040.

The manipulation controller 1100 is configured to generate and transmit the control data including instructions with respect to the computed sequence of control forces to the low-level robot controller (e.g., an actuator controller of the manipulator) such that the instructions cause the manipulator to apply the computed sequence of control forces (contact forces) on the object in step 1050. The robot grasps the re-oriented parts so that they can be then used for the desired task (assembly or packing) in step 1060.

FIG. 11A shows a block diagram illustrating a robotic control system 1100 for controlling motions of a robot according to embodiments of the present invention.

FIG. 11B shows a robotic system (robot) 1150 to manipulate objects on the table-top 900 according to a trajectory generated by the proposed robust trajectory optimization problem according to embodiments of the present invention. The robotic control system 1100 is configured to control an actuator system 1103 of the robot 1150. The robotic control system 1100 may be referred to as a control system of a robot or a robotic controller.

The robotic control system 1100 may include an interface controller 1110B, a processor 1120, and a memory unit 1130B. The memory unit 1130B is configured store a computer-implemented method including a non-linear programming module, a non-linear optimization solver and an optimization module and non-linear static model representing input-output relationships between contact forces and movements with respect to predetermined objects. The processor 1120 may be one or more than one processor unit, and the memory unit 1130B may be memory devices, a data storage device, or the like. The interface controller 1110B can be an interface circuit, which may include analog/digital (A/D) and digital/analog (D/A) converters to make signal/data communication with sensors 1101 including force sensors and vision sensor(s) 1102 and a motion controller 1150B of the robot 1150. Further, the interface controller 1110B may include a memory to store data to be used by the A/D or D/A converters. The sensors 1101 are arranged at joints of the robot (robot arm(s) or manipulator) or picking object mechanism 1104 (e.g. fingers) to measure the contact state with the robot. The vision sensors may be arranged in any positions that provide a viewpoint to observe/measure the object state representing the positional relationship among the object, the table-top, and additional contact surface.

The control system 1100 includes an actuator controller (device/circuit) 1150B that includes a policy unit 1151B to generate action parameters to control a robotic system 1150 that controls robot arm 1155, handling mechanism or combinations of the arms 1103 including handling mechanism 1103-1, 1103-2, 1103-3 and 1103-#N, according to the number of joints or handling fingers. For instance, the sensors 1101 may include acceleration sensors, angle sensors, force sensors or tactile sensors for measuring object position as well as forces during external. For instance, the interaction between an object and a robot arm of the robotic system can be represented using complementarity constraints to capture the contact state between the object and the robot arm of the robotic system. In other words, the interactions are based on the contact state represented by the relation between a slipping velocity of the object on a table-top and the friction of the object with the table-top when the object is moved by the robot arm.

The interface controller 1110B is also connected to the sensors 1101 that measure/acquire states of the motion of the robot mounted on the robot. In some case, when the actuators are electrical motors, the actuator controller 1150B may control individual electric motors that drive the angles of the robot arms or handling of the object by the handling mechanism. In some case, the actuator controller 1150B may control the rotations of individual motors arranged in the arms to smoothly accelerate or safely decelerate the motion of the robot in response to the policy parameters generated from the computer-implemented method 1000 stored in the memory unit 1130B includes modeling modules 1101B for optimization and optimization modules 1140B for control signals. Further, depending on the design of the object handling mechanism, the actuator controller 1150B may control the lengths of the actuators in response to the policy parameters according to the instructions generated by the computer-implemented method 1000.

The control system 1100 is connected to an imaging device or vision sensors 1102 which provides RGBD images. In another embodiment, the vision sensors 1102 can include a depth camera, thermal camera, RGB camera, computer, scanner, mobile device, webcam, or any combination thereof. In some cases, the vision sensors 1102 may be referred to as a vision system 1102. The signals from the vision sensors 1102 are processed and used for classification, recognition or measuring the object state.

Figure 12:
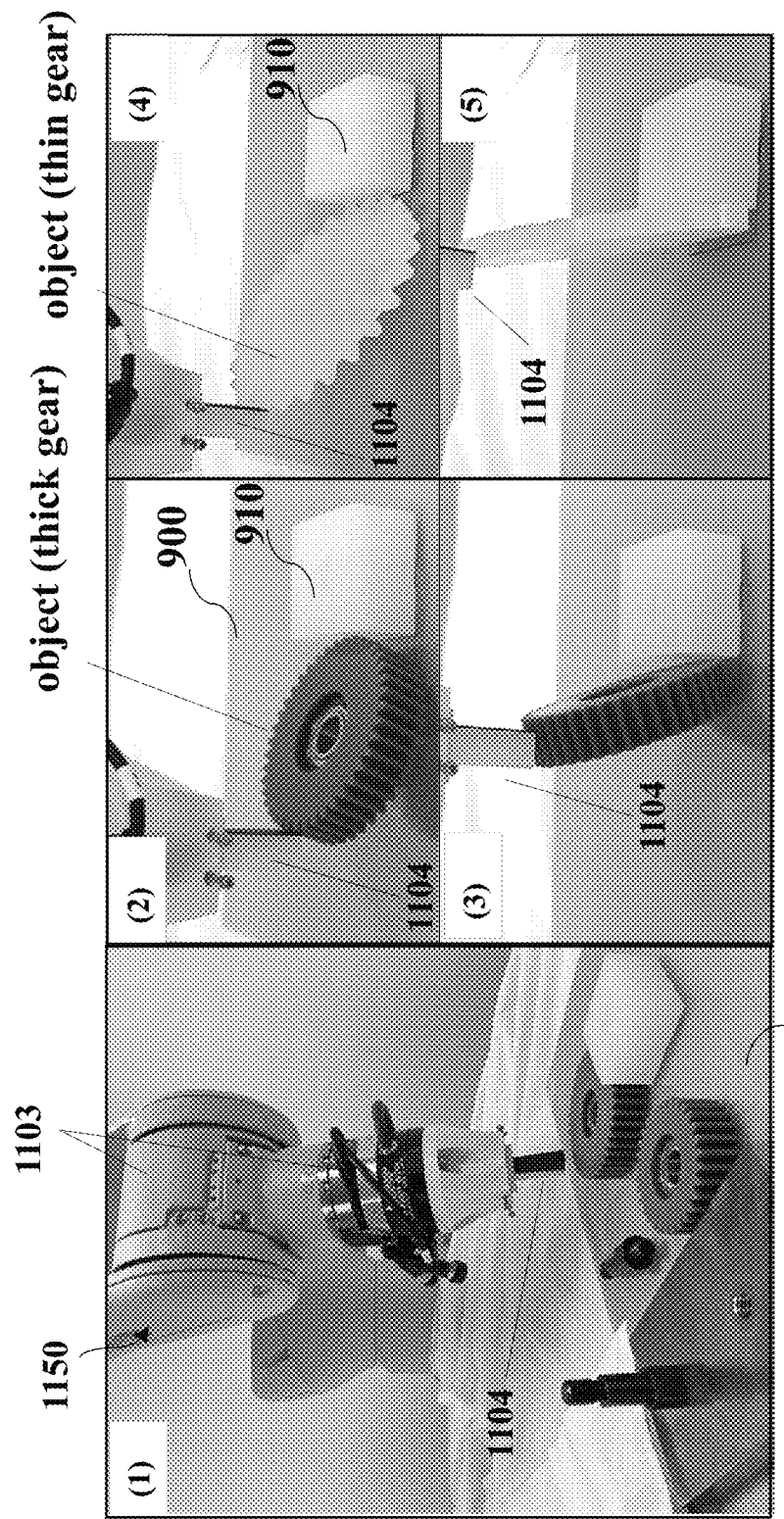
FIG. 12 shows examples of reorienting parts for assembly using pivoting manipulation primitive, according to embodiments of the present invention.

FIG. 12 shows examples of controlled trajectory of objects during pivoting manipulation according to the method 1000 of the control system 1100 in the robotic system 1150.

The figures show a series of actions, poses, and contact configurations (1)-(2)-(3) and (1)-(4)-(5) to reorienting different objects/parts for assembly using pivoting manipulation primitive. Such reorientation could possibly be required when the parts being assembled are not easy to grasp in the initial poses or the parts to be inserted during assembly are not in the desired pose (such as the pegs). The figure shows some instances during implementation of the controller to reorient a thick gear and a thin gear. In FIG. 12, the robot 1150 can use the manipulation arm with the finger 1104 to reorient parts on a planar surface to allow grasping or assist in assembly by manipulating objects to a desired pose. The desired pose can be a target position of the object on a workbench. Note that this manipulation is challenging as it requires controlled slipping, and thus it is imperative to consider robustness of the control trajectories.

Examples of Experiment

We implement our controller using a 6 DoF manipulator to demonstrate the efficacy of our proposed method for gear 1. To evaluate robustness for objects with unknown mass, we solve the optimization with mass different from the true mass of the object and implement the obtained trajectory on the object. The results of the implementation for a gear are shown in FIG. 13. The actual mass of the gear is 140 gms, and we test the proposed algorithm where the controlled trajectory is computed using the mass listed in FIG. 13. We can see that the controlled trajectories computed using the proposed bilevel optimization algorithm is able to succeed in all test trials in pivoting the object with significant uncertainty in the mass of the object.

Figure 14:
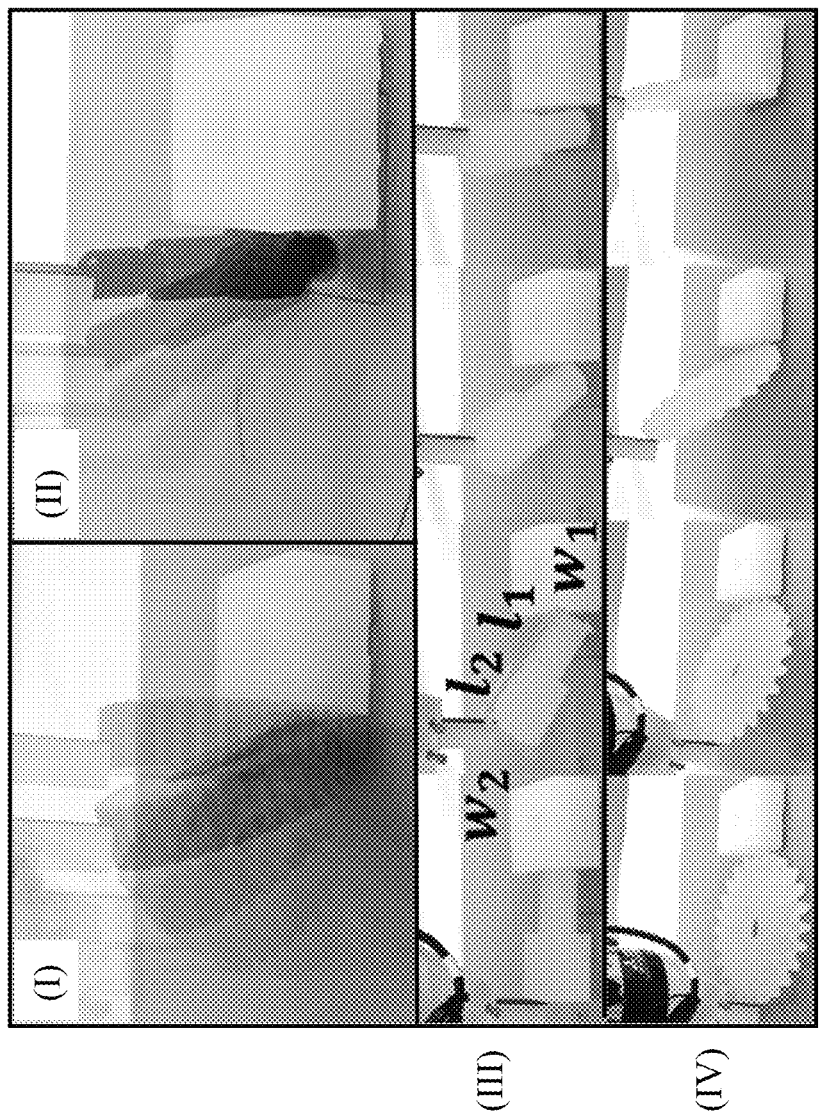
FIG. 14 shows snapshots of hardware experiments, indicating the white peg and gear.

FIG. 13 shows examples of controlled trajectory of objects during pivoting manipulation according to the method 1000 of the control system 1100 in the robotic system 1150. The figures show a series of actions, poses, and contact configurations for four different objects in (I)-(IV) in FIG. 14.

FIG. 15 shows the list of the dimension of the objects and the friction coefficients of the different surfaces that were used in computing the controlled trajectory using the proposed method. In particular, FIG. 15 shows the dimension, mass and friction coefficients for the four objects shown in FIG. 14. Note that the three coefficients of friction in FIG. 15 correspond to the three points of contact A, B and P as was shown earlier in FIGS. 2, 3A, 3B, 4A, 4B and 7.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A computer-implemented manipulation method for performing desired manipulation by reorienting an object on a workbench by a manipulator of a robotic system using external contacts of the object with a part of the workbench, wherein the method uses a processor coupled with a memory storing instructions implementing the method, wherein the instructions, when executed by the processor, carry out at steps of the method, comprising:
   acquiring measurement data from vision sensors and force sensors arranged on the robotic system;
   determining an input-output relation for the object based on a nonlinear static model representing input-output relationships between contact forces and movements of the object on the workbench;
   representing interaction between the object and the manipulator using complementarity constraints to capture the contact state between the object and the manipulator;
   formulating a representation for frictional stability of the object based on the non-linear static model at the external contacts with the workbench;
   formulating a bilevel optimization problem so as to maximize the frictional stability over a position trajectory of the object being manipulated on the workbench;
   estimating, using the frictional stability, uncertainty value in physical parameters to be compensated;
   solving the bilevel optimization problem using a non-linear optimization solver and generating control data with respect to a sequence of the contact forces being applied to the object by using the manipulator; and
   transmitting the control data that instruct the manipulator to perform the reorienting the object on the workbench according to the sequence of the contact forces for obtaining a target position of the object.

2. The method of claim 1, wherein the part of the workbench is arranged to contact to at least two external contacts of the object.

3. The method of claim 1, further generating a positional relationship for estimating the frictional stability given a contact configuration of the object with the workbench.

4. The method of claim 1, further converting the bilevel optimization problem to a single-level, large-scale nonlinear programming problem using Karush-Kuhn-Tucker (KKT) conditions and epigraph trick.

5. The method of claim 1, wherein the sensors include force torque sensors (F/T sensors).

6. The method of claim 1, wherein the uncertainty value includes incorrect coefficient of friction.

7. The method of claim 1, the manipulator is a six degree of freedom (6 DoF) manipulator.

8. The method of claim 1, wherein the manipulator includes servo motors and a gripper.

9. The method of claim 1, wherein the solving the bilevel optimization problem computes a frictional stability margin of the object.

10. The method of claim 1, wherein the bilevel optimization problem consists of two lower-level optimization problems.

11. A manipulation controller for reorienting an object by a manipulator of a robotic system using external contacts of the object during manipulations, comprising:
   an interface controller configured to acquire measurement data from sensors arranged on the robotic system;
   at least one processor; and
   a memory configured to store a computer-implemented method including a non-linear programming module, a non-linear optimization solver and an optimization module and non-linear static model representing input-output relationships between contact forces and movements with respect to predetermined objects, wherein the method uses the at least one processor coupled with the memory storing instructions implementing the method, wherein the instructions, when executed by the at least one processor, carry out at steps of the method, comprising:
   acquiring measurement data from vision sensors and force sensors arranged on the robotic system;
   determining an input-output relation for the object based on a nonlinear static model representing input-output relationships between contact forces and movements of the object on the workbench;
   representing interaction between the object and the manipulator using complementarity constraints to capture the contact state between the object and the manipulator;
   formulating a representation for frictional stability of the object based on the non-linear static model at the external contacts with the workbench;
   formulating a bilevel optimization problem so as to maximize the frictional stability over a position trajectory of the object being manipulated on the workbench;
   estimating, using the frictional stability, uncertainty value in physical parameters to be compensated;
   solving the bilevel optimization problem using the non-linear optimization solver and generating control data with respect to a sequence of the contact forces being applied to the object by using the manipulator; and
   transmitting the control data that instruct the manipulator to perform the reorienting the object on the workbench according to the sequence of the contact forces.

12. The controller of claim 11, wherein the controller further generates a positional relationship for estimating the frictional stability given a contact configuration of the object with the environment.

13. The controller of claim 11, where the controller further converts the bilevel optimization problem to a single-level, large-scale nonlinear programming problem using KKT conditions and epigraph trick.

14. The controller of claim 11, wherein the part of the workbench is arranged to contact to at least two external contacts of the object.

15. The controller of claim 11, further generating a positional relationship for estimating the frictional stability given a contact configuration of the object with the workbench.

16. The controller of claim 11, wherein the sensors include force torque sensors (F/T sensors).

17. The controller of claim 11, wherein the uncertainty value includes incorrect coefficient of friction.

18. The controller of claim 11, the manipulator is a six degree of freedom (6 DoF) manipulator.

19. The controller of claim 11, wherein the manipulator includes servo motors and a gripper.

20. The controller of claim 11, wherein the solving the bilevel optimization problem computes a frictional stability margin of the object.

21. The controller of claim 11, wherein the bilevel optimization problem consists of two lower-level optimization problems.

* * * * *